P. A. GUYE.
PROCESS FOR THE RECOVERY OF NITROUS OXIDS.
APPLICATION FILED JAN. 4, 1919.
1,331,105. Patented Feb. 17, 1920.
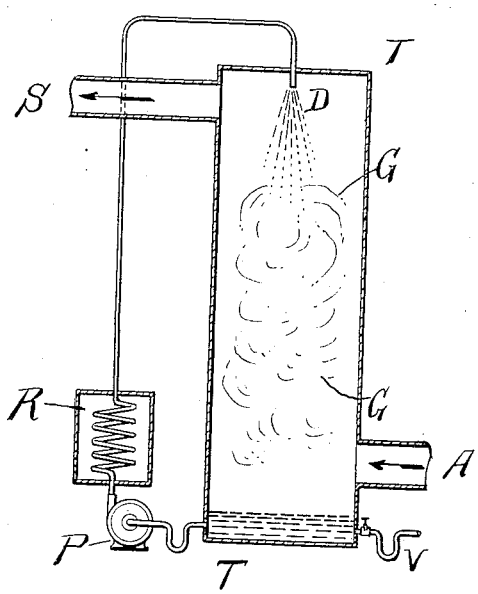
INVENTOR
Philippe Auguste Guye
BY
Meyers, Cushman & Rea
ATTORNEYS

UNITED STATES PATENT OFFICE.

PHILIPPE AUGUSTE GUYE, OF GENEVA, SWITZERLAND.

PROCESS FOR THE RECOVERY OF NITROUS OXIDS.

1,331,105.   Specification of Letters Patent.   Patented Feb. 17, 1920.

Application filed January 4, 1919. Serial No. 269,728.

*To all whom it may concern:*

Be it known that I, PHILIPPE AUGUSTE GUYE, a citizen of Switzerland, residing at Geneva, Switzerland, have invented new and useful Improvements in Processes for the Recovery of Nitrous Oxids, of which the following is a specification.

This invention relates to a new and improved process of recovering nitrous oxids (such as peroxid of nitrogen, either in its pure state, or mixed with nitrous anhydrid) which are present in an excess of dry, inert gas, such as air.

In the present instance it is my purpose to provide a simple and efficient process by means of which the nitrous oxids may be recovered expeditiously and economically.

In the practice of my invention the inert gas containing the nitrous oxids is conducted into an apparatus where is is liquefied at a low temperature by means of a cooled liquid which will not react chemically with the nitrous oxids, but which is nevertheless capable of dissolving the latter. In order to obtain a thorough extraction of nitrous oxids diluted to a proportion of 1% in volume, the liquefaction should be made at a low temperature of —50 deg. C., but if it be made at about —30 deg. C. there can be recovered the major portion of the nitrous oxids diluted in the above mentioned proportion of 1% in the mixture of inert gases. Even at a temperature of —20 deg. C. a considerable quantity of the oxids will be recovered so that the practice of my invention even at the latter temperature will be advantageous.

The process can be carried on in any apparatus designed to put a liquid into reaction with the gas. For instance, in the drawing I have shown an apparatus comprising an absorption chamber T having a gas inlet A at the bottom and a gas outlet S adjacent the top. A pump P communicates with the bottom of the absorption chamber and with the refrigerator R, the line pipe of the latter leading to and into the top of the absorption chamber and terminating in a distributer D. A valve drain pipe V permits the liquid to be withdrawn from the absorption chamber with a view to its further utilization. The absorbing liquid at a proper temperature is pumped from the bottom of the chamber through the refrigerator and passing through the distributer D falls through the chamber to the bottom of the latter. The incoming gases rising through the chamber meet the down-coming liquid, and an agitation takes place in the chamber, as indicated at G. When the liquid is sufficiently charged with nitrous gases the latter are freed by any proper means, such as by distillation or crystallization by refrigeration. The liquid falling to the bottom of chamber T will return to the refrigerator and may be conveniently further utilized. In the selection of a refrigerating and absorbing liquid, only those liquids should be used which will not solidify at the adopted temperature, and which will not react chemically with the nitrous oxids yet will easily dissolve the latter. For example, I may employ for the absorbing liquid carbon tetrachlorid ($CCl_4$) with carbon hexachlorid ($C_2Cl_6$), added thereto, and I may also use carbon tetrabromid ($CBr_4$) at the same time.

Furthermore, I may employ dry nitrous anhydrid which is slowly oxidized at low temperatures. The liquid obtained in this instance (a mixture of nitrous anhydrid and nitrogen peroxid) may be utilized directly to produce either nitrous anhydrid by treatment with nitric oxid; or pure peroxid of nitrogen by treatment with oxygen; or concentrated nitric acid (with more than 90% $HNO_3$) by treatment with water and oxygen under a pressure of several atmospheres (from 3 to 7).

Since the nitrous oxids are recovered in carbon tetrachlorid, mixed with or without carbon hexachlorid or tetrabromid added thereto, the solution previously obtained can be treated directly with nitric oxid or oxygen, and in the first case a solution of nitrous anhydrid is obtained and in the second case a solution of peroxid of nitrogen results. Finally, these solutions, treated at ordinary temperature with water and oxygen under pressure, permit the preparation of concentrated nitric acid which is separated by difference of density.

What I claim is:

1. The process of recovering nitrous oxids from a mixture of said oxids with other gas, which consists in liquefying the oxids by reducing their temperature to at least —20 degrees centigrade through contact with a refrigerating liquid capable of dissolving nitrous oxids and free from chemical interaction therewith.

2. The process of recovering nitrous oxids from a mixture of said oxids with other gas, which consists in liquefying the oxids by reducing their temperature to at least −20 degrees centigrade by means of direct contact with a refrigerating liquid, including carbon tetrachlorid.

3. The process of recovering nitrous oxids from a mixture of said oxids with other gas, which consists in liquefying the oxids by reducing their temperature to at least −20 degrees centigrade by means of direct contact with a refrigerating liquid including a mixture of carbon tetrachlorid, carbon tetrabromid, and carbon hexachlorid.

4. The process of recovering nitrous oxids from a mixture of said oxids with other gas, which consists in liquefying the oxids by reducing them to a relatively low temperature by direct contact with a refrigerating liquid, adapted to dissolve the liquefied oxids.

5. The process of producing nitric acid from a mixture of nitrous oxids with other gas, which consists in liquefying said oxids by a suitable reduction in temperature in the presence of a liquid capable of dissolving said oxids and remaining in liquid form at the liquefying temperature of said oxids, and then treating said liquefied oxids with water and oxygen under pressure.

In testimony whereof I have hereunto set my hand.

PHILIPPE AUGUSTE GUYE.